United States Patent [19]

Schlösser

[11] Patent Number: 4,463,527

[45] Date of Patent: Aug. 7, 1984

[54] GRAVE MARKER FOR MEMORIAL

[75] Inventor: Helmut Schlösser, Bottrop, Fed. Rep. of Germany

[73] Assignee: Kühl Bauelemente GmbH, Bochum, Fed. Rep. of Germany

[21] Appl. No.: 383,126

[22] Filed: May 28, 1982

[30] Foreign Application Priority Data

Jun. 3, 1981 [DE] Fed. Rep. of Germany ....... 3121949

[51] Int. Cl.³ .............................................. E04H 13/00
[52] U.S. Cl. .......................................... 52/103; 47/66;
47/79; 52/38
[58] Field of Search ................... 52/102, 103, 38, 105,
52/131; 40/124.5, 140, 618; 47/66, 79

[56] References Cited

U.S. PATENT DOCUMENTS

| 688,043 | 12/1901 | White | 52/103 |
| 1,060,970 | 5/1913 | Brown | 47/79 |
| 1,130,203 | 3/1915 | Schreyer | 47/79 |
| 1,982,432 | 11/1934 | Hull | 47/79 |

FOREIGN PATENT DOCUMENTS 1997895  5/1968  Fed. Rep. of Germany .
1908494  9/1970  Fed. Rep. of Germany ........ 52/103

Primary Examiner—Alfred C. Perham
Attorney, Agent, or Firm—Karl F. Ross; Herbert Dubno

[57] ABSTRACT

A memorial for a grave or a multigrave cemetery plot has a polyhedral rectangular parallelepipedal body composed of sheet metal, e.g. aluminum, mounted upon a base and having a removable cover by which access can be afforded to the interior of the body for storing grave-maintenance equipment or plant-supplying water therein.

7 Claims, 7 Drawing Figures

GRAVE MARKER FOR MEMORIAL

FIELD OF THE INVENTION

My present invention relates to memorials, and more particularly to grave markers, especially for multigrave plots and individual graves, which obviate disadvantages of conventional stone memorials, i.e. gravestones.

BACKGROUND OF THE INVENTION

Stone grave markers, e.g. gravestones, obelisks and like grave-marking devices are generally carved from natural rock formations, shaped, engraved and mounted upon a base or foundation, e.g. of concrete.

The face of the stone can be engraved by sandblasting to memorialize the individual, family or group of individuals buried in the region of the stone and the stone is generally mounted upon the previously emplaced foundation on a base with the aid of a crane or other force-multiplying device or machine because of the large mass of the stone.

In spite of the natural characteristics of the stone and, generally, even because of the natural characteristics, the stone tends to weather uncontrolledly and the engraving loses definition and may even be eroded entirely.

After some time such gravestones can become unsightly and undecipherable.

In many cases, the ground in front of the stone is set aside for flowers or plants which may be tended by persons having an association with the deceased. In such cases, it is frequently necessary to water or provide attention to the plants and, for this purpose, watering cans and horticultural tools may be concealed behind the stone for use by the person tending the grave or the plot.

Sometimes such watering cans are removed by others to the detriment of the individuals tending the grave. This makes grave-tending particularly difficult, especially since grave-tending frequently is carried out by older people or individuals who are partly infirmed or disabled.

A further disadvantage is that each grave marker of conventional design must be fabricated separately. Mass production has never, therefore, found its place in the production of grave markers except under unusual circumstances and hence the unit cost of such gravestones is comparatively high.

In German open application DE-OS No. 1,908,494, a grave marker is described which has a body composed of metal, e.g. copper, brass, aluminum or iron and having a hollow interior which is accessible when an upper portion is tilted on a lever-linkage or the like so that grave-tending utensils can be stored in the interior of this memorial.

Such tiltable memorials have a disadvantage that they are extremely expensive, in part because of the complex lever mechanism, without which the tilting of the relatively heavy upper portion would be impossible or impractical because of the strength which would be necessary.

Another disadvantage of this earlier system is that it requires subdivision of the memorial into upper and lower portions which differ in shape and, indeed, collectively form a structure of complex configuration which is expensive, time-consuming and labor intensive to fabricate.

For this reason, the earlier system did not gain commercial acceptance and was not able to be manufactured effectively by mass production or serial production techniques.

Another disadvantage of the memorial described in this document is that the memorial could not readily be adapted to individual wishes or could only be adapted to the individuality of the potential purchaser at high cost.

Finally, mention should be made of the fact that a hollow interior could only be used effectively for the storage of utensils and not for other purposes, e.g. the watering of plants, which will be shown below to be important.

In German open application No. 1,997,895, a memorial is described which can be composed at least in part of synthetic resin material and which provides a space to which access is afforded by a closable door and in which the grave-tending utensils may be stored.

This system has the disadvantage that synthetic resin materials are especially prone to aging processes which limit their life, undergo changes in color with weathering and time, and generally do not provide a competitive system for natural stone grave markers from the point of view of aesthetics.

OBJECTS OF THE INVENTION

It is the principal object of the present invention to provide an improved grave marker for individual graves and multigrave plots, whereby the disadvantages of earlier systems are avoided.

Still another object of this invention is to provide an improved grave marker which is aesthetically competitive with natural stone, weathers and ages well and is of comparatively low cost.

Still another object of this invention is to provide a grave marker capable of industrial fabrication, i.e. mass production or serial production, and which nevertheless can reflect the individual desires as to differentiation often required for such memorials and which also facilitates plant care and the like at the grave site or plot.

SUMMARY OF THE INVENTION

These objects and others which will become apparent hereinafter are attained, in accordance with the present invention, in a memorial for a grave plot or a single grave which comprises a box-shaped (preferably rectangular parallelepipedal) metal body mounted upon a base and having a bottom, sidewalls and top, the bottom and sidewalls being secured together and formed from at least one sheet metal member or plate having at least one pair of edges abutting each other and a joint at which ends of the plate or plates adjoin and are secured together, i.e. by welding. The top, however, is formed as a removable or movable cover for the box-like structure.

In other words, the grave marker of the invention is a polyhedron composed of sheet metal with walls and a bottom secured together and forming a stable upwardly open structure which is closed at its upper end by the removable cover.

The memorial of the invention has been found to be especially effective as a storage facility for grave-tending tools or devices and because of its comparatively low weight being transported readily and emplaced upon the base, even without the aid of force-multiplying machinery, cranes and the like. This is true even when the size of the body corresponds to conventional gravestone or memorial dimensions.

Since the body is composed of sheet metal or metal plates, the surfaces can have the texture, colors and other aspects of appearance desirable by the purchaser. The fabrication of the unit from sheet metal allows a wide variety of forms to be created, thus appealing to the aesthetic senses of the purchaser.

The sheet metal is highly resistant to shock, impact, intentional destructive activity and even playful activity.

In large measure, the high strength of the memorial and its ability to withstand both intentional and accidental actions is a function of the polyhedral configuration which requires a multiplicity of corners and bent edges which ensure sufficient strength.

The bottom wall, which is integral with or secured to the other wall and the removable cover cooperate with the polyhedral configuration to provide an extremely stable structure.

Since the interior of the memorial is fully concealed by the removable cover in the closed position of the latter, others cannot determine what devices, tools or utensils are stored inside and hence the danger of loss is reduced.

The storage space is sealed by the bottom and the cover so that wind and weather cannot damage the stored objects.

The sheet metal which is used, according to the invention, is preferably aluminum sheet of a thickness of between 3 and 7.5 millimeters, preferably a thickness of 5 millimeters, which can be rolled to provide a one-sheet structured surface and can then have opposite edges joined together along a butt weld.

Aluminum has a particular advantage for the purposes of the present invention because it not only has a naturally attractive surface but also can be permanently colored by anodization (eloxidation) or like techniques to suit the requirements or desires of the purchaser.

I have also found copper sheet to be advantageous, copper being of greatest interest when the surfaces are not be be protected with coatings or the like and are to be allowed to weather natually. This weathering provides a unique coloration and imparts an interesting appearance to the body. The edges of the copper sheet can be soldered where they come together.

The soldering or welding of the edges of the sheet also serves to seal the interior of the body and to improve the stability thereof.

The anodization, which may be used to color the box-like body after the welded or soldered seams have been made, is preferably carried out in the finished body.

The metal memorial of the present invention can be combined with natural stone. More specifically, it has been found to be advantageous to form the sheet metal body with two mutually parallel spaced-apart columns, leaving a gap between them.

A stone slab, e.g. with an inscription, can be inserted in this gap or recess and can be held in place by any conventional means, e.g. angle members. Within the metal body itself, the various walls can be braced with angle members as well.

An advantage of this construction is that the stone slab can be transported separately from the lightweight metal body. Thus the stone slab can be prepared in the facilities of a conventional gravestone marker and transported to the grave site where it is inserted into the metal unit, which has been fabricated by conventional metal working means utilizing serial or mass production techniques to produce a composite memorial with even greater permanence than stone memorials because the slab is protected by the metal body.

The various columns can form compartments within the metal body, which can be used for different purposes, e.g. the storage of different items or even as one or more water receiving tanks. The metal body, even when it is not formed into columns to receive a stone slab, can be provided with partitions defining such compartments.

In areas in which moisture is a problem, the memorial of the invention can be provided with a rain water collector and can meter the rain water to plants, flowers and the like. This can be done most simply by providing the cover with an upstanding rim so that it forms a trough in which water can collect, the trough having a downwardly extending outlet which opens into the interior of the polyhedral body so that the latter forms a tank.

The tank can be connected by one or more ducts with sites at which plants are provided.

Naturally, the use of the memorial of the present invention as a water storage and water dispensing unit need not be limited to regions at which moisture is at a premium.

The entire interior of the polyhedral metal body can form a tank or a tank can be provided in a limited portion of this body and an outlet can be provided from the tank or tanks within the body. The tank or tanks can be filled by rain as described or by any other means and the outlets can run to a plant-receiving receptacle in which hydroculture is conducted. This receptacle can be located directly in the region of the gap or the memorial or somewhat remote therefrom.

Depending upon the flow cross section and the length of the ducts running to the plants, the plants can be watered for several days or even over several weeks with the stored water without requiring direct maintenance. A float or the like can be used to signal the level of water within the tank, i.e. in the memorial.

According to another feature of the invention, a number of memorials or, rather, respective water tanks, may be interconnected to form a group adapted to retain substantially larger quantities of water which can be utilized for any desired purpose, including the watering of plants. Naturally, the chambers can also be utilized for the storage of other objects or materials, e.g. soil-improving ingredients, topsoil and even gravel or other materials utilized for beautification purposes. In addition, other objects apart from maintenance tools may be stored therein.

Advantageously, the memorial may be associated with a comparatively large cover plate, which may be provided over or on part of a multigrave and can be provided with recesses or cavities in which plants are set and which commiunicate via passages with the water-storage tank or tanks of the associated memorial or group of memorials.

While the cover may be of a type which can be simply lifted from the sheet metal body, it has been found to be advantageous in some cases to provide a hinge along the edge of the cover and the body, preferably between an end of the cover and a short side of the body, to enable the cover to be swung upwardly and to afford access to the interior of the body.

The opposite ends of the cover can be provided with a latch which can be locked to prevent access to the contents of the memorial by unauthorized persons. When the cover overhangs the sheet metal body, no separate handhold need be provided in the cover so that objects within the body need not be exposed through openings utilized for handholds.

In order to prevent the latch from becoming rusted, contaminated or otherwise inaccessible or inoperative, the latch can be provided with a spring-loaded protective plate and or can be located in an inwardly offset portion of the body or cover. Consequently, only the individual properly equipped with a key can open the latch and release the cover.

An important feature of the invention is that the device can be produced on an industrial scale and serves as a storage facility for all grave maintenance tools, equipment and materials.

The system makes it possible for a single body to supply water (from its water tank) to the usual plant life in the environs of the grave as well as to any hydroculture plants provided in the region. Grave maintenance is simplified and the overall appearance of the grave area is improved.

The shape of the memorial can be selected at will and it is possible to provide in the region of the front wall niches, recesses or pockets in which plants or the like can be received. It is possible to close a niche in the memorial, for example, with a grate and/or to provide means for mounting therein or upon the memorial, plants, candles or other symbols, mementoes or religious artifacts.

BRIEF DESCRIPTION OF THE DRAWING

The above and other objects, features and advantages of the present invention will become more readily apparent from the following description of the invention, reference being made to the accompanying drawing in which.

SPECIFIC DESCRIPTION

Figure 1:
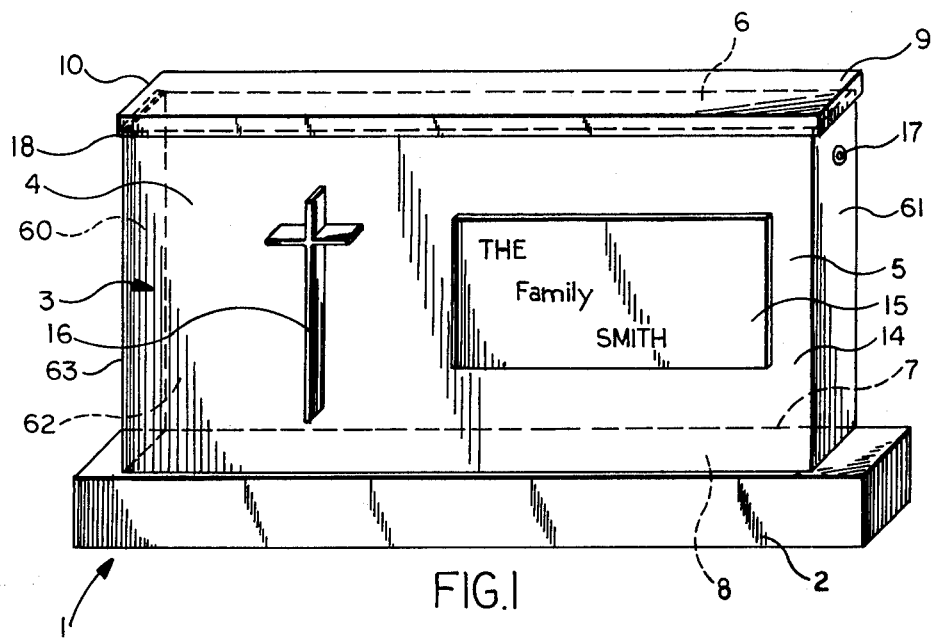
FIG. 1 is a perspective view of a memorial in accordance with this invention, showing the cover in place.

In the drawing described below, corresponding elements in the various FIGURES may be designated by identical reference numerals and various elements of the several embodiments, although only described in detail with respect to one, may be utilized for others as well.

Figure 7:
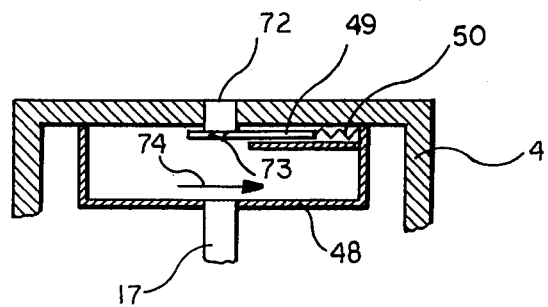
FIG. 7 is a cross sectional view taken in the region of a latch on a cover of a memorial in accordance with the present invention.

For example, the latch of FIG. 7 may be used to retain the cover of any of the embodiments upon the box-like unit of the memorial.

Figure 4:
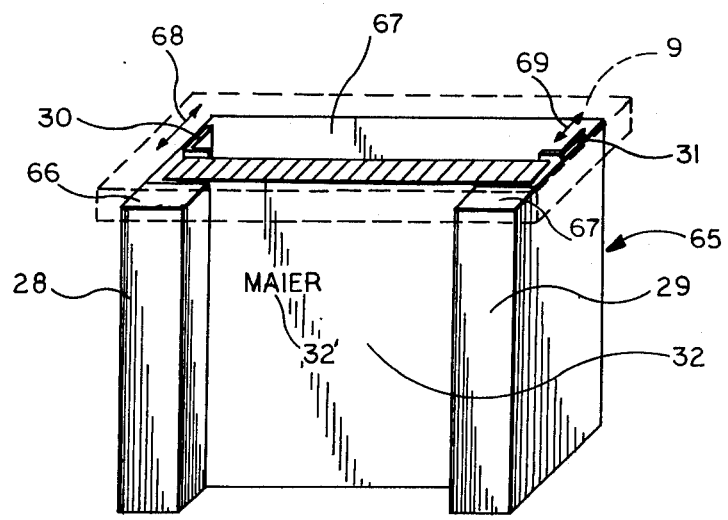
FIG. 4 is a perspective view showing an embodiment of the invention in which a stone slab is inserted through the memorial, the cover being represented in broken lines.

While FIG. 4 shows a slab extending the full height of the monument, shorter, narrower and thinner slabs may be utilized by being inset in appropriate recesses, to carry the various legends, obituaries or the like.

Figure 2:
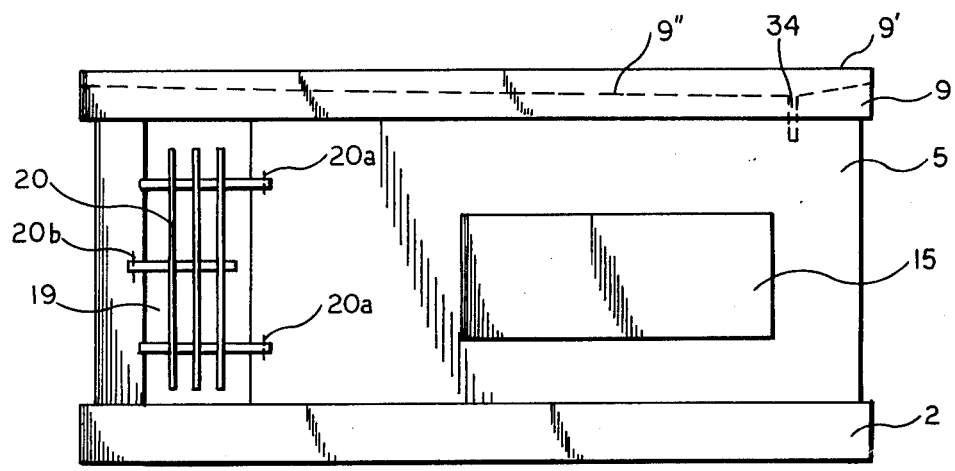
FIG. 2 is an elevational view of another memorial having a niche closed by a grate.
Figure 3:
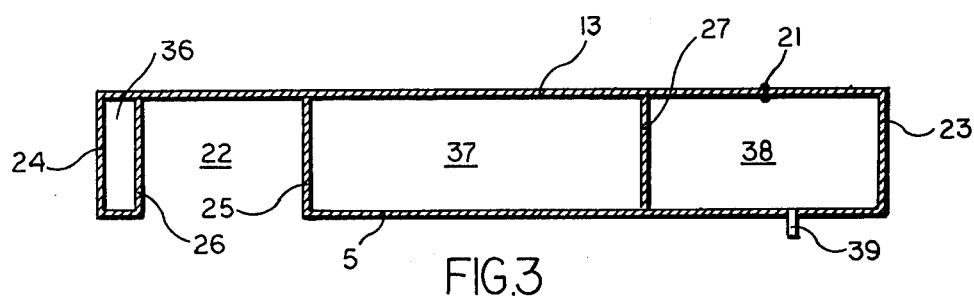
FIG. 3 is a horizontal cross sectional view through the body of the device of FIG. 2 with the grate removed.

While a niche is shown in the embodiments of FIGS. 2 and 3, it also may be used in other embodiments and the water collecting cover of FIG. 2 can be utilized in the other embodiments as well.

The drawing, moreover, has illustrated the memorial highly diagrammatically and hence structural details which were not important to the present explanation have been omitted.

As can be seen from FIG. 1, the memorial 1 can comprise a base 2, which is surmounted by box-like body 3 in the form of a polyhedron having a bottom 8, a front wall 5, a pair of side walls 60 and 61 and a rear wall 62. The bottom joins the walls 5, 60–62 along weld seams 7 forming the lower edges. The vertical edges 63 joining the walls together are bend in the aluminum sheet 4 which forms this body as can be seen at the corners of FIG. 3.

The surface 14 of the front face of the body 3 is structured, e.g. to carry a plate 15 bearing, for example, the family name when the memorial is utilized for a multigrave plot. Religious symbols, e.g. a cross 16, can be applied on the face 14.

The surfaces of the body 3 can be anodized to improve weather resistance and provide any desired color.

FIG. 1 also shows clearly that the memorial 1 is basically a hollow body which is open at 6 upwardly, and is closed by a cover 9 which can overhang the upper edges of the body 3. The body 3 is connected to the base 2 (by screws or the like, not shown) with due care to maintain the hollow interior sealed. Along the left-hand edge 10 of the cover 9 the latter is connected to the body 3 by a hinge 18 while the opposite end of the cover 9 is secured by a latch, of which only the keyhole 17 is visible so that, unless the proper key is inserted, the interior of the body 3 remains inaccessible.

The plate 15, which carries the alpha-numeric material and/or pictorial matter may be connected to the body 3 by screws or welding. The cross 16 can be attached similarly.

The space within the body 3, once the cover 9 is refitted, can be utilized to store horticultural and other grave-maintenance tools and equipment and watering cans and the like. It may also be partitioned (see FIG. 3) to form a water storage tank from which water may be dipped to tend the plants of flowers in the region of the memorial.

In the embodiment of FIG. 2, the front wall 5 is provided with a recess 19, which can have the cross section of the niche 22 of FIG. 3, which can be closed by a grill 20. The grill 20 may be hinged at 20a to the front face 5 of the polyhedral body and may be held closed by a latch pin 20b or a key lock.

The grill 20 can permit the interior of the memorial to be at least partially visible so that access to any image, lamp, candle or plant arrangement disposed in the niche will be limited but the object will, nevertheless, be visible.

From FIG. 3 it will be apparent that the body of the unit is composed of sheet metal, which is bent to form the edges and may have ends which are butt welded as shown at 21 for the rear wall 13.

In this embodiment, the niche 22 is defined between side walls 23 and 24 form the outer walls of the unit with the walls 5 and 13 previously mentioned.

A partition 27 within the body subdivides the interior thereof into compartments 37 and 38, a further compartment being formed at 36 in the column to the left of the niche.

The cover 9 has a raised edge 9' lying above a downwardly included floor 9" which descends to a low point at which an outlet 34 opens into the water collection tank 38 or another vessel located therein. As the water collection tank 38 is utilized directly as a water reservoir, an outlet 39 can be provided at the bottom thereof and can be connected by passages or pipes 40 and 41 (see FIG. 6) to water the plants 42.

In the embodiment of FIG. 4, the sheet metal body 65 is formed with a pair of columns 28 and 29, each of which is hollow so that compartments 66 and 67 are formed for storage purposes and can be accessed when the cover 9 is lifted. The cover 9 is hinged and latched, as has already been described, but in a manner which is not visible in FIG. 4, from which the cover has been removed and is only shown in broken lines.

The further compartment 67 is disposed rearwardly of the columns and can be utilized for the storage of grave-maintenance tools and materials while the compartments 66 and 67 can be used as water storage reservoirs. A pair of angle irons 30 and 31 are spaced from the columns on the opposite sides of the memorial so that a stone slab can be inserted into the space between the angle irons and the columns, the slab being represented at 32 and being provided with indicia as shown at 32'. Of course, when the cover 9 is replaced, not only are the compartments closed, but the cover overhangs the front of the stone slab to protect it against the weather. The angle irons 30, 31 can be shiftable as represented by the arrows 68, 69 to allow adjustment for slabs of different thicknesses.

Figure 5:
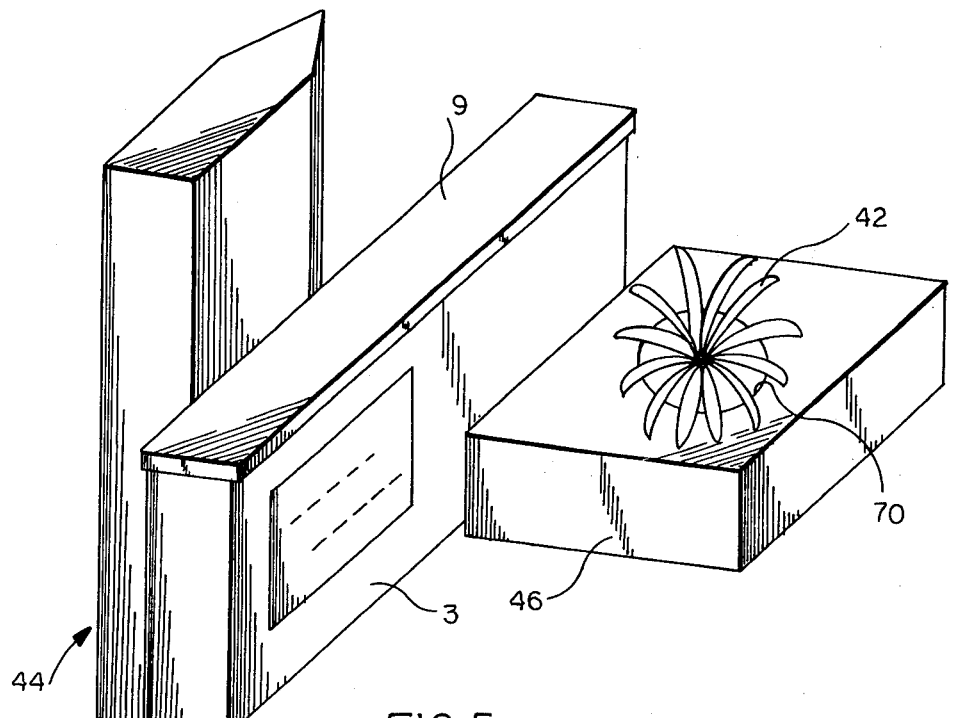
FIG. 5 is a perspective view of a memorial provided with a plurality of sheet metal units and a receptacle for plants grown by hydroponics.

FIG. 5 shows a group 44 of sheet metal bodies 3 provided with covers 9 and forming water reservoirs in the manner described or compartments in which tools and grave-tending materials can be stored.

The sheet metal bodies 46 can be provided with a recess 70 for a plant 42 grown hydroponically with water from the reservoir.

Figure 6:
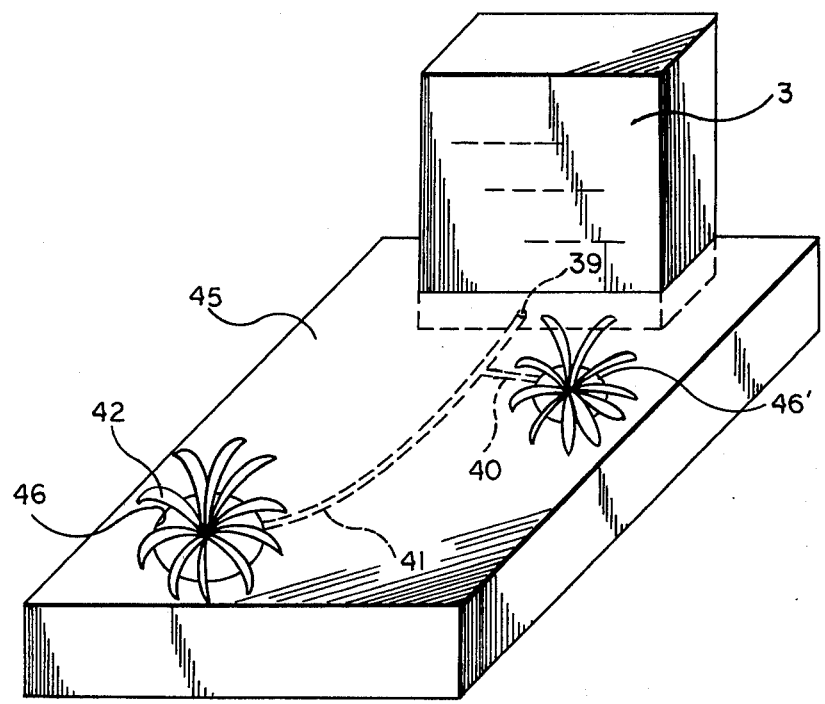
FIG. 6 is a perspective view of a memorial having a grave-covering plate with plants watered from a tank in the memorial.

For example, as can be seen from FIG. 6, pipes 40 and 41 can lead to the plants 42 at locations 46, 46' in a grave-covering slab 45 so that practically all the plants of the cemetry plot are uniformly watered.

From FIG. 7 is will be apparent that the latch 17 can be protected by spacing it from the key opening 72 in the side wall of the body 3 and interposing a plate 49 between the latch 17 and this opening. A spring 50 urges the plate 49 over the opening 72 so that insertion of the key, by camming engagement with a ram 73 on the plate can shift the plate in the direction of the arrow 74 and permit engagement of the key in the latch 17. A channel-shaped member 48, which can be formed by angle irons, can carry the latch.

I claim:

1. A memorial for a single grave or multigrave plot, comprising:
    a base;
    a hollow upwardly open polyhedral sheet-metal body mounted on said base and having a plurality of angularly adjoining walls, at least one butt weld between ends of an aluminum sheet forming said body and bent at edges connecting said adjoining walls, and a bottom;
    a partition subdividing an interior of said body into at least two upwardly open compartments including a tool-storage compartment and a heater-storage compartment; and
    a cover movably mounted on said body for closing the upper ends of both of the compartments thereof whereby access is afforded to the interior of said body and to said compartments by movement of said cover into an open position, said cover having an upstanding edge and a downwardly inclined floor extending over both compartments and provided at its low point with an outlet opening into the water-storage compartment whereby water is collected in said body.

2. The memorial defined in claim 1 wherein said sheet has a thickness of 3 to 7.5 millimeters and said body is anodized.

3. The memorial defined in claim 1 wherein said body is formed with a pair of columns and a pair of angle members spaced from said columns inwardly of said body, said memorial further comprising a stone slab received between said columns and said angle members.

4. The memorial defined in claim 1 wherein said body is provided at its bottom with a water-discharge passage, said memorial further comprising means for retaining a plant for hydroponic culture, and a duct connecting the last mentioned means with the water discharge watering a plant therefrom.

5. The memorial defined in claim 1 wherein said cover is hinged at one side to said body and is provided with a lock on its opposite side for securing said cover into a closed position.

6. The memorial defined in claim 5 wherein said body is provided with a hole affording said access to said lock, said memorial further comprising a spring-loaded plate covering said hole.

7. The memorial defined in claim 6 wherein said spring-loaded plate is located in a channel and said lock is mounted on said channel.

* * * * *